(12) United States Patent
Brauchle et al.

(10) Patent No.: US 8,887,587 B2
(45) Date of Patent: Nov. 18, 2014

(54) MEASUREMENT DEVICE

(75) Inventors: Jörg Brauchle, Berlin (DE); Ralf Berger, Berlin (DE)

(73) Assignee: Deutsches Zentrum fuer Luft- und Raumfahrt E.V., Cologne (DE)

(*) Notice: Subject to any disclaimer, the term of this patent is extended or adjusted under 35 U.S.C. 154(b) by 310 days.

(21) Appl. No.: 13/546,352

(22) Filed: Jul. 11, 2012

(65) Prior Publication Data

US 2014/0013870 A1   Jan. 16, 2014

(51) Int. Cl.
| | |
|---|---|
| *G01D 11/00* | (2006.01) |
| *F16M 11/00* | (2006.01) |
| *B64D 47/08* | (2006.01) |
| *G01C 11/02* | (2006.01) |
| *G03B 17/00* | (2006.01) |
| *G03B 17/56* | (2006.01) |

(52) U.S. Cl.
USPC ........... 73/865.8; 73/866.5; 348/144; 396/12; 396/419

(58) Field of Classification Search
CPC ...... B64D 47/08; G01C 11/02; G01C 11/025; G01D 11/00; G03B 17/00; G03B 17/561; G03B 15/006; F16M 11/00
USPC .............. 73/865.8, 866.5; 244/1 R; 348/144; 356/918–920; 396/7, 12, 419, 428, 396/FOR. 756, FOR. 765, FOR. 913
See application file for complete search history.

(56) References Cited

U.S. PATENT DOCUMENTS

| | | | | |
|---|---|---|---|---|
| 4,223,753 | A * | 9/1980 | Bradbury | 180/6.2 |
| 5,486,760 | A * | 1/1996 | Selleri et al. | 324/262 |
| 6,266,142 | B1 * | 7/2001 | Junkins et al. | 356/623 |
| 6,536,724 | B2 | 3/2003 | Furuta | |
| 7,295,726 | B1 * | 11/2007 | Milanovic et al. | 385/18 |
| 7,753,921 | B2 * | 7/2010 | Leitner | 606/130 |
| RE44,984 | E * | 7/2014 | Wawro | 396/419 |
| 8,770,867 | B2 * | 7/2014 | Dumig et al. | 396/428 |
| 2014/0185013 | A1 * | 7/2014 | Brown | G03B 17/561 |

FOREIGN PATENT DOCUMENTS

| | | | | |
|---|---|---|---|---|
| DE | 102011101513 A1 * | 11/2012 | | B64D 47/08 |
| FR | 2363084 A1 | 3/1978 | | |
| GB | 1539581 A * | 1/1979 | | F41G 7/2213 |
| JP | 06123395 A * | 5/1994 | | G03B 17/56 |
| WO | WO 2004015435 A1 * | 2/2004 | | G01R 33/022 |
| WO | WO 2007142553 A2 * | 12/2007 | | F01C 9/00 |

OTHER PUBLICATIONS

Wintney, "Getmapping Reveals New 'AZICAM' Oblique Camera System", Press Release, Jun. 30, 2009, URL: http://www2.getmapping.com/News/13, pp. 1-2.

(Continued)

*Primary Examiner* — Thomas P Noland
(74) *Attorney, Agent, or Firm* — Laurence A. Greenberg; Werner H. Stemer; Ralph E. Locher

(57) ABSTRACT

A measuring device, in particular a measuring device for remote sensing, has a measuring instrument and an apparatus for movably mounting the measuring instrument. The apparatus has two non-parallel rotation axes. The rotation axes are different from a longitudinal axis of the measuring instrument. The measuring instrument is connected to a rotatable drive element via a power transmission element.

11 Claims, 1 Drawing Sheet

(56) References Cited

OTHER PUBLICATIONS

Wiedemann, "Photogrammetrisch Schrägluftbilder mit dem Aerial Oblique System AOS", 2009, pp. 1-8, Swissphoto GmbH, Mittelstr. 7, 12529 Schönefeld, DE, URL: http://www.bsf-swissphoto.ch/fileadmin/content/documents/1_3D-Mapping/2009-04_DGPF_AOS.pdf, pp. 1-8 (in German).

Pechatnikov, M., et al., "VisionMap A3—The New Digital Aerial Survey Mapping System", 2009, Eilat, Israel, URL: http://www.visionmap.com/files/02_FIG_2009.pdf, pp. 1-2.

* cited by examiner

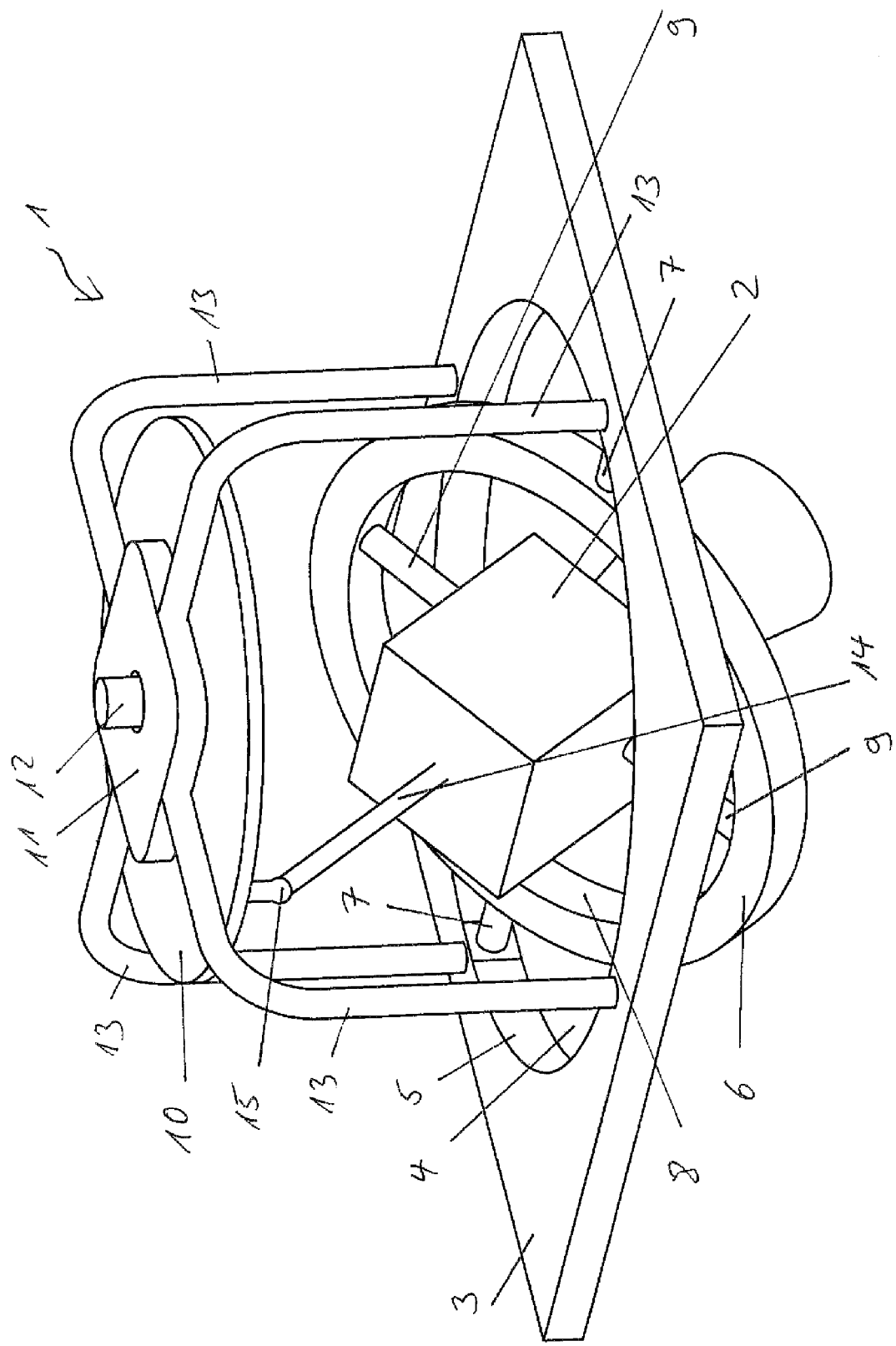

MEASUREMENT DEVICE

BACKGROUND OF THE INVENTION

Field of the Invention

The invention relates to a measuring device, in particular for remote sensing, the measuring device having a measuring instrument and an apparatus for movable mounting of the measuring instrument.

In air-based remote sensing, the sensor system or, in general terms, the measuring instrument is usually directed vertically downward (nadir). Orthomosaic and surface models, for example, may be derived therefrom. A particular configuration is seen in so called oblique systems, which have at least one obliquely facing sensor (for example a matrix camera) (photogrammetric oblique aerial images with the Aerial Oblique System AOS, Albert Wiedemann, DGPF Tagungsband 18/2009). The data from such oriented sensors can be used either to produce/improve orthophotos or for texturing surfaces that rise up (in particular building facades). There is an array of systems with one or more permanently mounted sensors that face in various directions. This approach leads to a significant conflict of aims: if the aim is to collect data with the lowest possible outlay on flying, the manufacturers increase the number of simultaneously active sensors. There are solutions that jointly drive one obliquely facing sensor, for example a camera, each for all four cardinal directions. The result of this is that the systems are large, heavy and cost intensive, and require correspondingly large platforms. Measuring systems with fewer sensors do not have these disadvantages to the same extent, but they do require substantially more outlay on flights so that the measurement provides areal coverage.

Air-based remote sensing systems having moving sensors exist, inter alia, for matrix cameras. Because of their disadvantages to date, they are available only sporadically, and will be explained below.

A suspended camera system is, for example, Visionmap A3 (VisionMap A3—The New Digital Aerial Survey and Mapping System; M. Pechatnikow et al., FIG Working Week 2009 Surveyors Key Role in Accelerated Development, Eilat, Israel, 3-8 May 2009), which pivots about the roll axis of the aircraft. It is only the two oblique views transverse to the flight direction that are imaged in this case.

Forward- and backward-facing views and an orientation between the cardinal direction axes are not possible. Such views require additional outlay on flights.

An azimuthally movable camera system is, for example, Azicam from GetMapping Plc. (Getmapping Reveals New 'AZICAM' Oblique Camera System, Press Release June 2009). In this case, the obliquely facing camera is rotated by motor into one of the four cardinal directions. However, rotating the camera housing about the optical axis has two grave disadvantages. Firstly, without specific technical solutions cable torsion renders continuous rotation by 360° impossible, something which leads to time-intensive restoration to the initial position, and secondly the camera image undergoes rotation by all three possible angles ω, φ and κ. This complicates the perspective representation in the photogrammetric process, since the image has to be rotated about its optical axis (κ). The long azimuth shaft harbors a considerable distortion potential, something which leads to imprecise orientation with respect to an inertial navigation system and/or a further camera.

Also known is a camera system that can be pivoted about the azimuth axis and uses two cameras. In this case, the principle of oblique view is that the two cameras are arranged on a vertical plane and have an angular offset. At one instant, a camera faces obliquely forward, and the second camera obliquely backward. By rotating the measurement setup by 90°, the cameras face in both directions transverse to the flight movement. All four cardinal directions are covered with the aid of two cameras in this way. The problems relating to continuous complete rotation (it takes time to stop the buildup and to restart backwards) and rotation by all three angles with the associated consequences already addressed are present here.

BRIEF SUMMARY OF THE INVENTION

The invention is based on the technical problem of providing a measuring device, in particular for remote sensing, that can be used to attain various viewing directions with a low outlay on control.

The solution to the technical problem results from the subject matters having the features as claimed. Further advantageous refinements of the invention follow from the subclaims.

In this case, the measuring device has a measuring instrument and an apparatus for movable mounting of the measuring instrument, the apparatus having two non-parallel rotation axes, the rotation axes not being the same as a longitudinal axis of the measuring instrument, the measuring instrument being connected to a rotatable drive element via a power transmission element. This permits a very simple and compact design, it being possible to move the drive element by a simple uniaxial drive, in order thus to impart a defined tumbling movement to the measuring instrument in the apparatus, that is to say the longitudinal axis of the measuring instrument moves through a defined path curve that, depending on configuration, can be from zero to infinity. In the case of zero, the drive element is correspondingly not driven, and in that of infinity the drive element executes a complete revolution, thus producing a closed path curve, preferably a circular path. In this case, a rotation about the longitudinal axis of the measuring instrument is avoided and, at the same time, all relevant viewing directions are gone through. It may be remarked at this juncture that when the measuring instrument is a camera the longitudinal axis is the same as the optical axis.

In one embodiment, the apparatus comprises a universal joint in the case of which the two rotation axes are at right angles to one another. Universal joints have the advantage of being able to describe a tumbling movement very easily.

In one embodiment, the universal joint has a base suspension that has an inner ring mounted rotatably uniaxially, the inner ring bearing the measuring instrument mounted uniaxially. Here, the base suspension is preferably arranged rigidly on a suitable platform, for example in a flying device.

In a further embodiment, the drive element is designed as a drive disk.

The drive element is preferably permanently connected to a shaft that can be driven rotatably by a drive unit. Here, the drive unit is preferably arranged in an immobile fashion and outside the moving parts. This avoids a necessary balancing of mass as well as joining of cables by comparison with designs where a drive unit (motor) is mounted on the inner ring.

In a further embodiment, there is provided for the drive element a rigid guide element that prevents uncontrolled movements of the drive element and/or of the shaft.

In a further embodiment, the guide element is rigidly connected to the base suspension. By way of example it is also possible in principle for the guide element to be fastened on the rigid drive unit or on another rigid platform.

In a further embodiment, the measuring device has a sensor system for detecting or determining a rotation angle of the drive element, it being possible to determine the angles of the rotation axes from the rotation angle of the drive element, and to determine the viewing direction of the measuring instrument therefrom. In this case, the sensor system can directly detect the angle on the drive element. However, it is also possible, alternatively or cumulatively, to detect the rotor position on the drive unit and to infer from the rotor position the angle of the shaft that is driving the drive element.

In a further embodiment, the power transmission element is designed as a rigid connection. In this case, the connection must also be suitably guided during the rotation of the drive element. In one embodiment, the rigid connection is designed in this case as a connecting rod that is preferably connected to the drive element via a spherical head bearing.

In a further embodiment, the measuring instrument is designed as a camera.

In a further embodiment, the drive element executes an n×360° rotation, with n>1. Because of the fact that cable torsion cannot come about, since the measuring instrument itself does not rotate, the drive element may be rotated continuously in one direction. Consequently, the measuring instrument also does not need to be braked in order to be able to return to its initial position. Consequently, the drive unit can be designed with smaller dimensions, and the energy requirement can be reduced, and this, in turn, results in a smaller and lighter overall system.

BRIEF DESCRIPTION OF THE SEVERAL VIEWS OF THE DRAWING

The invention is explained in more detail below with the aid of a preferred exemplary embodiment. The sole FIGURE shows a perspective illustration of a measuring device for remote sensing.

DESCRIPTION OF THE INVENTION

The measuring device 1 comprises a measuring instrument 2 in the form of a camera, and an apparatus for movable mounting of the measuring instrument 2. To this end, the apparatus comprises a base suspension 3. The base suspension 3 is designed as a square or rectangular plate that has a preferably circular opening 4. An inner ring 6 is rotatably mounted on an inner edge 5 of the base suspension 3 via a first rotation axis 7. The measuring instrument 2 is rotatably mounted on an inner wall 8 of the inner ring 6 via a second rotation axis 9. The two rotation axes 7, 9 are in this case perpendicular to one another and form a universal joint. Furthermore, the measuring device 1 has a drive element 10 in the form of a drive disk. The drive disk is connected to a shaft 12 that can be rotatably driven by a drive unit (not illustrated). By way of example, the drive unit is designed in this case as a stepping motor. The drive element 10 is therefore also rotated by a rotation of the shaft 12. The shaft 12 is guided in this case by a guide element 11 that is arranged above the drive element 10. The guide element 11 is rigidly connected in this case to the base suspension 3 via connecting rods 13. Consequently, the guide element 11 guides the shaft 12, on the one hand, and the drive element 10, on the other hand. The measuring instrument 2 is connected to the drive element 10 via a rigid connecting rod 14 and a spherical head bearing 15, the connection being acentric. In this case, the connecting rod 14 is flush with the longitudinal axis of the measuring instrument.

If the shaft 12 is now driven, the drive disk also rotates. This rotation is then transmitted via the connecting rod 13 to the measuring instrument 2, which carries out a defined tumbling movement in the universal joint, and so the viewing direction of the measuring instrument 2 likewise changes in a permanently defined fashion.

An evaluation unit (not illustrated) can in this case determine the respective viewing direction from the angular position of the shaft 12 or drive disk, since there is a fixed relationship between the angle of the shaft 12 and the angles on the rotation axes 7, 9. The viewing direction can in this case simultaneously be stored with the recorded data of the measuring instrument 2. However, it can also be provided to make additional use of sensor systems for detecting the angles of the rotation axes 7, 9, for example in order to detect the viewing direction more accurately, or for the purposes of redundancy.

In addition to aerial photography flights with cameras of all types, the measuring device can also be used, for example, for 3D city modelling or mappings. By way of example, the measuring device can also be used for laser scanning or for acoustic pressure investigations.

The invention claimed is:

1. A measuring device, comprising:
a measuring instrument having a longitudinal axis;
an apparatus for movably mounting said measuring instrument, said apparatus having two non-parallel rotation axes different from said longitudinal axis of said measuring instrument; and
a rotatable drive element connected to said measuring instrument via a power transmission element.

2. The measuring device according to claim 1, wherein said measuring instrument is configured for remote sensing.

3. The measuring device according to claim 1, wherein said apparatus comprises a universal joint.

4. The measuring device according to claim 3, wherein said universal joint comprises a base suspension having an inner ring rotatably mounted about an axis, said inner ring bearing said measuring instrument mounted on an axis.

5. The measuring device according to claim 4, wherein a rigid guide element is provided for said drive element.

6. The measuring device according to claim 5, wherein said guide element is rigidly connected to said base suspension.

7. The measuring device according to claim 4, which comprises a sensor system configured to detect or determine a rotation angle of said drive element, wherein the rotation angle of said drive element enables the angles of said universal joint to be determined and the angles of said universal joint enable a viewing direction of the measuring instrument to be determined.

8. The measuring device according to claim 1, wherein said drive element is a drive disk.

9. The measuring device according to claim 1, wherein said drive element is permanently connected to a shaft and said shaft is rotatably driven by a drive unit.

10. The measuring device according to claim 1, wherein said power transmission element is a rigid connecting rod connected to said drive element via a spherical head bearing.

11. The measuring device according to claim 10, wherein said drive element is configured to execute an n×360° rotation.

* * * * *